United States Patent [19]

Nagashima

[11] Patent Number: 4,468,689
[45] Date of Patent: Aug. 28, 1984

[54] COLOR SEPARATION CIRCUIT

[75] Inventor: Yoshitake Nagashima, Chigasaki, Japan

[73] Assignee: Tokyo Shibaura Denki Kabushiki Kaisha, Japan

[21] Appl. No.: 414,910

[22] Filed: Sep. 3, 1982

[30] Foreign Application Priority Data

Oct. 8, 1981 [JP] Japan .............................. 56-160511

[51] Int. Cl.³ ........................................... H04N 9/535
[52] U.S. Cl. ..................................................... 358/31
[58] Field of Search ........................................ 358/31

[56] References Cited

U.S. PATENT DOCUMENTS

4,219,842 8/1980 Miller ..................................... 358/31
4,389,665 6/1983 Nagao .................................... 358/31

OTHER PUBLICATIONS

D. J. Sauer, "Design and Performance of a CCD Comb Filter IC", RCA Review, vol. 41, Mar. 1980, pp. 29–56.
W. A. Lagoni, "A Base-Band Comb Filter for Consumer Television Receivers", IE3 TRNS CE-26, Nov. 1979.

*Primary Examiner*—Michael A. Masinick
*Attorney, Agent, or Firm*—Finnegan, Henderson, Farabow, Garrett & Dunner

[57] ABSTRACT

A color separation circuit includes a comb filter for generating output signals corresponding to the sum of and difference between a composite input video signal and a signal prepared by delaying the composite input video signal by one horizontal scanning time period. The difference signal from the comb filter is sampled at timings with a phase difference of 90° of a chrominance signal contained therein. By passing through a low-pass filter the signal sampled at a timing corresponding to the 33° phase in each cycle of to chrominance signal, an EQ-chrominance signal is obtained. By passing through a low-pass filter the signal sampled at a timing corresponding to the 123° phase in each cycle of the chrominance signal, an EI-chrominance signal is obtained.

7 Claims, 2 Drawing Figures

F I G. 2
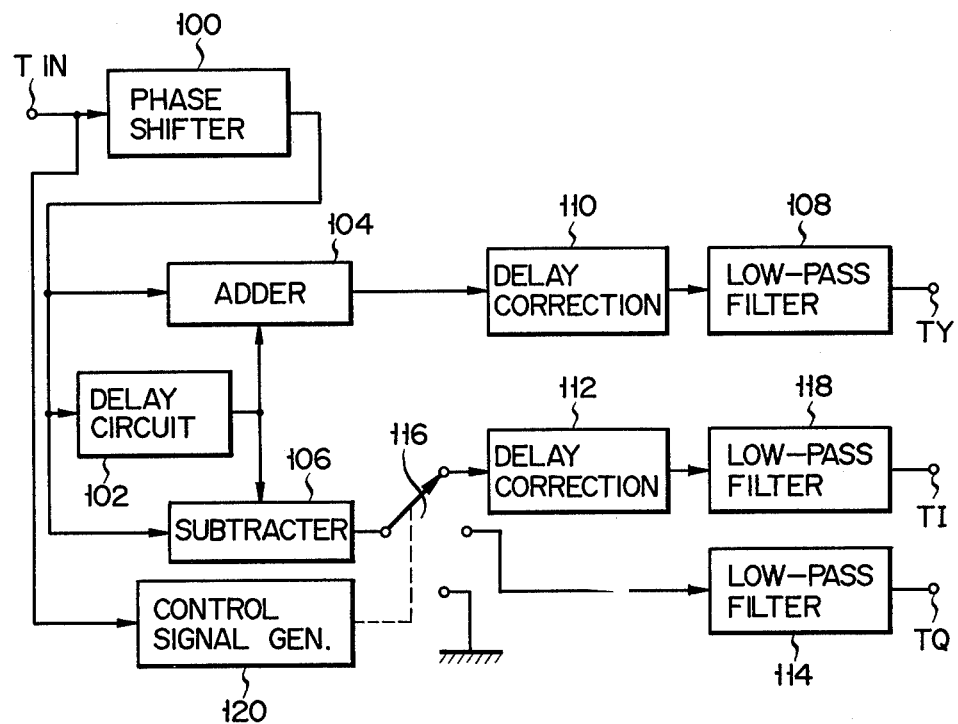

COLOR SEPARATION CIRCUIT

BACKGROUND OF THE INVENTION

This invention relates to a color separation circuit for use in, for example, a color television receiver.

Conventionally, in a color television receiver, color television monitor, etc., a CCD type comb filter circuit is employed for separating a luminance signal EY and color difference signal EC from a composite video signal of NTSC system. This type of comb filter circuit, as shown in FIG. 1, comprises a delay circuit 10 for delaying the input video signal supplied to an input terminal T1 by one horizontal scanning time period, an adder circuit 12 for adding up the input video signal and the output signal of the delay circuit 10, a subtracter circuit 14 for obtaining a difference between the input video signal and the output signal of the delay circuit 10, a low-pass filter 16 connected to the adder circuit 12 through a delay correction circuit 18, and a band pass filter 20 connected to the subtracter circuit 14. The low-pass filter 16 is used to separate a luminance signal by EY having a bandwidth of 0 to 4 MHz from the output signal of the adder circuit 12, while the band pass filter 20 is used to separate a color difference signal EC having a bandwidth of 3.58 MHz ±0.5 MHz from the output signal of the subtracter circuit 14. The delay correction circuit 18 is used for correcting the difference in time delay between the output signals of the low-pass filter 16 and the band pass filter 20. Note here that in the Figure, the circuits 10, 12, 14 and 18 are constructed in the form of a charge coupled device (CCD), which is driven by a clock pulse generated in synchronism with a burst signal of the input video signal.

The above-mentioned CCD comb filter circuit shown in FIG. 1 functions to separate the luminance signal EY from the input video signal to generate the same from the output terminal T2 and also separate the color difference signal EC from the input video signal to generate the same from the output terminal T3. The CCD comb filter circuit, however, does not have the function of demodulating the color difference signal EC.

SUMMARY OF THE INVENTION

Accordingly, an object of the invention is to provide a color separation circuit capable of demodulating the color difference signal.

According to one aspect of the invention, there is provided a color separation circuit comprising delay means for delaying a composite input video signal of NTSC system by one horizontal scanning period of time, an adder circuit for obtaining a sum of the output signal of the delay means and the input video signal, a subtracter circuit for obtaining a difference between the output signal of the delay circuit and the input video signal, a demultiplexer circuit for sampling a chrominance signal contained in the output signal of the subtracter at timings with a phase difference of 90° to generate a first sampled signal representing the EI-chrominance signal component and a second sampled signal representing the EQ-chrominance signal component, a first filter circuit for receiving the first sampled signal to derive the EI-chrominance signal component, a second filter circuit for receiving the second sampled signal to derive the EQ-chrominance signal component, a third filter circuit for separating an EY-luminance signal component from the output signal of the adder circuit and drawing it out, and delay correction means connected to the first and third filter circuits to correct the difference in phase delay between the output signals of the first to third filter circuits.

BRIEF DESCRIPTION OF THE DRAWING

FIG. 2 is a block diagram of a color separation circuit according to an embodiment of the invention.

DETAILED DESCRIPTION OF THE PREFERRED EMBODIMENT

Figure 1:
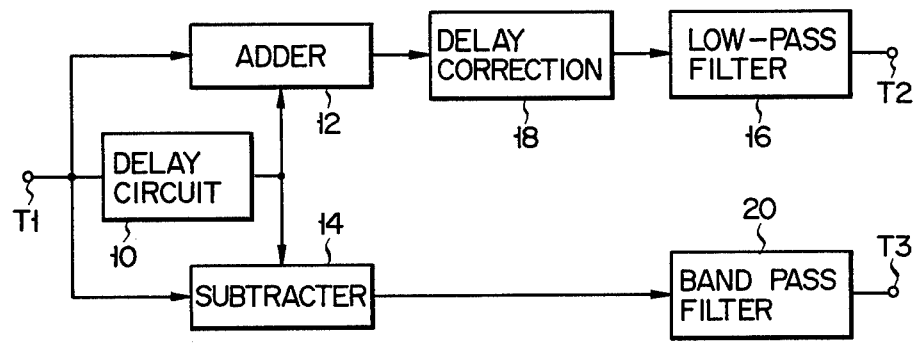
FIG. 1 is a block diagram of a prior art color separation circuit.

In FIG. 2, a color separation circuit according to an embodiment of the invention is shown. This color separation circuit is comprised of a phase shifter 100 for causing a chrominance signal of the composite input video signal of NTSC system supplied to the input terminal TIN to undergo a phase shifting of 33°, a delay circuit 102 for delaying the video signal from the phase shifter 100 by one horizontal scanning time period, an adder circuit 104 for adding up the output signals of the phase shifter 100 and delay circuit 102, a substracter circuit 106 for obtaining a difference between the output signals of the phase shifter 100 and delay circuit 102, and a low-pass filter 108 connected to the adder circuit 104 through a delay correction circuit 110. The delay circuit 102, adder circuit 104, subtracter circuit 106, low-pass filter 108 and delay correction circuit 100 are respectively constructed, and are allowed to operate, in the same manner as the delay circuit 10, adder circuit 12, subtracter 14, low-pass filter 16 and delay correction circuit 18 shown in FIG. 1. Accordingly, from an output terminal TY connected to the low-pass filter 108, there is drawn out a luminance signal EY (=0.30 ER+0.59 EG+0.11 EB, where ER, EG and EB represent red, green and blue signals, respectively).

The subtracter circuit 106 is connected through a demultiplexer 116 to delay correction circuit 112, a low-pass filter 114 having a bandwidth of 0.5 MHz, and to the ground. The delay correction circuit 112 is connected to an output terminal T1 through a low-pass filter 118 having a bandwidth of 1.5 MHz. The low-pass filter 114 is connected to an output terminal TQ. The demultiplexer 116 responds to a control clock signal of 14.32 MHz (=3.58 MHz×4) generated from a control signal generator 120 in synchronism with the burst signal contained in the video signal and used as a phase reference in order to sample the output signal of the subtracter 106 at timings corresponding to the phases of 0°, 90°, 180° and 270° in each cycle of a chrominance signal in the output signal of the subtracter 106. The signal component sampled at a timing corresponding to the 0° phase is supplied to the low-pass filter 114 having a bandwidth of 0.5 MHz, and the signal component sampled at a timing corresponding to the 90° phase is supplied to the low-pass filter 118 having a bandwidth of 1.5 MHz. Further, the signal components sampled at timings corresponding to the 180° and 270° phases are supplied to the ground.

In FIG. 2, the delay circuit 102, adder circuit 104, subtracter circuit 106, delay correction circuits 110 and 112, and demultiplexer 116 may be realized in the form of a charge coupled device driven by the control clock pulse signal of 14.32 MHz generated from the control signal generator 120. In this case, the demultiplexer 116 is constructed in such a way that it receives serial input charge signals and sequentially generates these signals from its ouput terminals at predetermined timings. The delay correction circuits 110 and 112 are connected to the low-pass filters 108 and 118 for the purpose of correcting the differences in phase delay between the output signals from the low-pass filters 108, 114, and 118.

Hereinafter, the operation of the color separation circuit shown in FIG. 2 will be explained.

The composite input video signal EM of NTSC system supplied to the input terminal TIN contains a color burst signal. The composite input video signal EM is a signal multiplexed by a luminance signal component EY and chrominance signal components EI and EQ as expressed in the following equation:

$$EM = EY + EI\cos(\omega t + 33°) + EQ\sin(\omega t + 33°) \quad (1)$$

where $\omega$ represents the angular frequency of the chrominance signal; and EI and EQ are expressed by the following equations (2) and (3).

$$EI = 0.736\,(ER-EY) - 0.268\,(EB-EY) \quad (2)$$

$$EQ = 0.478\,(ER-EY) - 0.413\,(EB-EY) \quad (3)$$

As apparent from the equation (1), the chrominance signal components EI and EQ are in 90° out-of-phase relationship with each other.

The phase of the chrominance signal contained in this composite video signal EM is delayed or shifted by 33° through the shifting operation of the phase shifter 100. On the other hand, this composite video signal EM is supplied to the control signal generator 120. This control signal generator 120 receives as a reference phase signal the color burst signal contained in the composite video signal EM and, at timings corresponding to the phases of 0°, 90°, 180° and 270° in each cycle of the chrominance signal contained in the output signal of the subtracter circuit 106, and causes the output state of the demultiplexer 116 to be changed. That is, at a timing corresponding to the 0° phase of the chrominance signal from the subtracter 106, the demultiplexer 116 supplies an output signal to the low-pass filter 114. Thus, the EQ-chrominance signal component in the output signal of the subtracter 106 is sampled, smoothed in the low-pass filter 114 having a bandwidth of 0.5 MHz, and then generated from the output terminal TQ. Further, at a timing corresponding to the 90° phase of the chrominance signal from the subtracter 106, the demultiplexer 116 supplies an output signal to the low-pass filter 118 through the delay correction circuit 112. Thus, the EI-chrominance signal component in the output signal of the subtracter 106 is sampled, smoothed in the low-pass filter 118 having a bandwidth of 1.5 MHz, and then generated from the output terminal TI. Further, at the timings corresponding to the 180° and 210° phases of the chrominance signal from the subtracter circuit 106, the demultiplexer 116 causes the output signal from the subtracter circuit 106 to be fed to the grounding terminal. The purpose for this arrangement can be seen in a case where the circuits 102, 104, 106, 110, 112 and 116 are constructed in the form of a CCD driven by a clock pulse signal from the control signal generator 120, and it is required to release to the ground the signal charge not contributed to the EI- and EQ-chrominance signals.

In the above-mentioned way, the color separation circuit shown in FIG. 2 permits the luminance signal EY and the chrominance signals EI and EQ to be drawn out from the output terminal TY, TI and TQ in the accordance with the composite input video signal received at the input terminal TIN.

The present invention is not limited to the embodiment described above. For Example, in the above-mentioned embodiment, the delay correction circuits 110 and 112 are connected, respectively, to the input terminals of the low-pass filters 108 and 118 so that they may be constructed, in the form of a CCD, on one chip together with the delay circuit 102, adder circuit 104, subtracter circuit 106 and demultiplexer 116. However, in order to make zero the difference in phase delay between the output signals of the low-pass filters 108, 114 and 118, they can also be connected to the output terminals of the low-pass filters 108 and 118 rather than to the input terminals.

Further, according to the invention, it is possible to omit the phase shifter 100 and to supply the composite input video signal directly to the delay circuit 102, adder circuit 104 and subtracter circuit 106. In this case, the control signal generator 120 generates a control clock signal of 14.32 MHz at an advanced phase difference of 33° from that of the burst signal contained in the composite input video signal. Thus, the output signal of the subtracter 106 is subject to the sampling operation of the demultiplexer 116 at the timings corresponding to the phases of 33°, 123°, 213° and 303° of the chrominance signal contained therein. In this case, by sampling the output signal of the subtracter 106 at a timing corresponding to the 33° phase of the chrominance signal, a sampled signal representing the chrominance signal component EQ is obtained, while by sampling that output signal at a timing corresponding to the 123° phase of that chrominance signal, a sampled signal representing the chrominance signal component EI is obtained.

What is claimed is:

1. A color separation circuit comprising:
   delay means for delaying a composite input video signal of NTSC system by one horizontal scanning time period;
   an adder circuit for obtaining a sum of the output signal of said delay means and the input composite video signal;
   a subtracter circuit for obtaining a difference between the output signal of said delay means and the composite input video signal;
   clock signal generating means;
   a demultiplexer circuit responsive to a clock signal from the clock signal generating means to perform a sampling operation for the output signal of said subtracter circuit at timings with phase difference of 90° of a chrominance signal contained therein to generate first and second sampled signals representing EI- and EQ-chrominance signal components respectively;
   a first filter circuit for receiving the first sampled signal to derive the EI-chrominance signal component;
   a second filter circuit for receiving the second sampled signal to derive the EQ-chrominance signal;
   a third filter circuit for separating an EY-luminance signal component from the output signal of said adder circuit to draw out the same; and
   delay correction means connected to said first and third filter circuits to correct the difference in phase delay between the output signals of said first to third filter circuits.

2. A color separation circuit according to claim 1, wherein said delay means, adder circuit, subtracter circuit and demultiplexer circuit are constructed in the form of a charge coupled device driven by a clock signal from said clock signal generating means.

3. A color separation circuit according to claim 1 or 2, wherein said delay correction means is comprised of a first delay correction circuit connected between said adder circuit and third filter circuit, and a second delay correction circuit connected between said demultiplexer circuit and said first filter circuit, said first and second delay correction circuits being constructed in the form of a charge coupled device.

4. A color separation circuit according to claim 3, which further comprises a phase shifter for delaying by 33° the color signal of the composite input video signal, and in which said clock signal generating means generates clock pulse signals in synchronism with a burst signal contained in the composite input video signal and at timings corresponding to the phases of 0°, 90°, 180° and 270°, in each cycle, of the chrominance signal contained in the output signal of said subtracter circuit.

5. A color separation circuit according to claim 4, wherein said demultiplexer circuit, responsive to a clock pulse generated from said clock signal generating means at a timing corresponding to the 0° phase in each cycle of the chrominance signal, samples the output signal from said subtracter circuit to supply the resultant signal to said second filter circuit, and, responsive to a clock pulse generated from said clock signal generating means at a timing corresponding to the 90° phase in each cycle of the chrominance signal, samples the output signal from said subtracter circuit to supply the resultant signal to said second delay correction circuit.

6. A color separation circuit according to claim 1 or 2, which further comprises a phase shifter for delaying by 33° the chrominance signal of the composite input video signal, and in which said clock signal generating means generates clock pulse signals in synchronism with a burst signal obtained in the composite input video signal and at timings corresponding to the phases of 0°, 90°, 180° and 270°, in each cycle, of the chrominance signal contained in the output signal of said subtracter circuit.

7. a color separation circuit according to claim 1 or 2, wherein said demultiplexer circuit, responsive to a clock pulse generated from said block signal generating means at a timing corresponding to the 0° phase in each cycle of the chrominance signal, samples the output signal from said subtracter circuit to supply the resultant signal to said second filter circuit, and, responsive to a clock pulse generated from said clock signal generating means at a timing corresponding to the 90° phase in each cycle of the chrominance signal, samples the output signal from said subtracter circuit to supply the resultant signal to said first filter circuit.

* * * * *